United States Patent Office 3,471,801
Patented Oct. 7, 1969

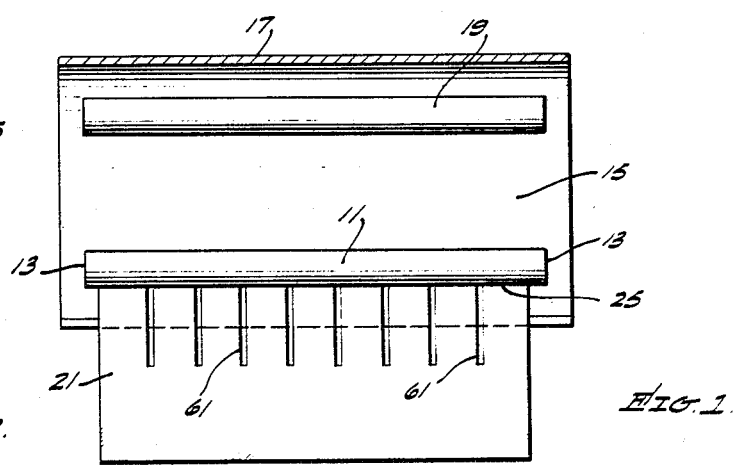
FIG. 1.
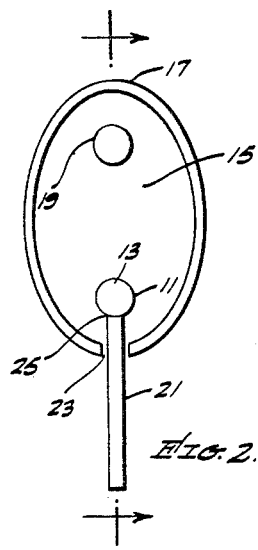
FIG. 2.
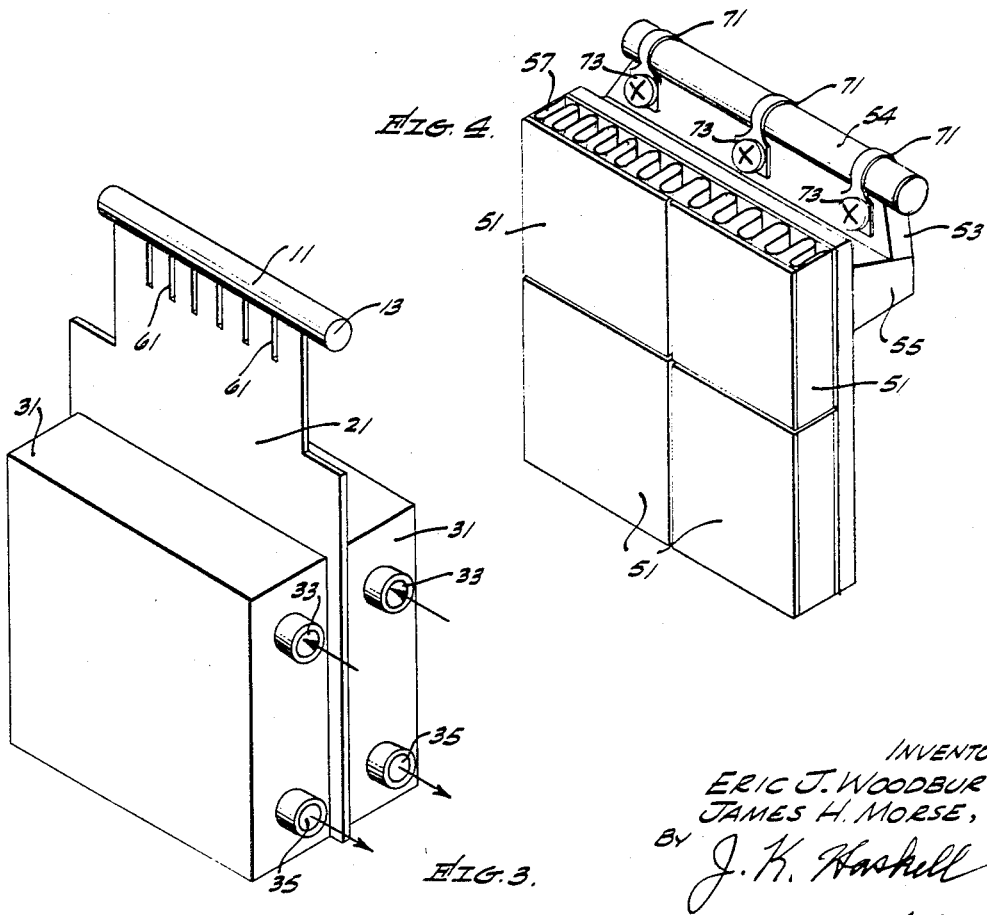
FIG. 4.
FIG. 3.
INVENTORS.
ERIC J. WOODBURY,
JAMES H. MORSE,
BY J. K. Haskell
ATTORNEY.

3,471,801
THERMALLY CONTROLLED SOLID-STATE LASER
Eric J. Woodbury, Tarzana, and James H. Morse, Malibu, Calif., assignors to Hughes Aircraft Company, Culver City, Calif., a corporation of Delaware
Filed Dec. 31, 1964, Ser. No. 422,644
Int. Cl. H01s 3/10
U.S. Cl. 331—94.5                          5 Claims

ABSTRACT OF THE DISCLOSURE

A solid-state laser rod is disposed within a focussed type pump cavity structure which also encloses a linear pump lamp so as to focus pump energy at the laser rod. The pump structure includes an elongated thermal conducting pedestal in thermal conductive contact with a longitudinal portion of the laser rod and extending outside the pump structure in a direction opposite that of the pump lamp, the pedestal having a narrower width dimension than the laser rod.

---

This invention relates to a thermally controlled solid-state laser and more particularly to a laser wherein a new and effective technique is utilized to control the temperature of an active laser element disposed within a pumping cavity.

In order to produce laser action in an active laser element, a certain minimum pump energy must be supplied per unit volume of the solid laseable material and it must be supplied above a minimum rate sufficient to overcome spontaneous decay. However, the energy absorbed in the solid material is only a small fraction of the radiative output of the pump generator, such as a xenon gas lamp. This is due to the fact that a certain amount of the pump energy will not reach the solid laseable material because not all of this energy can be directed into the material, and of that amount which does, only radiative energy in the proper absorption region for the particular material used is effective in providing the excitation necessary for laser action. The energy not utilized in excitation of the laseable material takes the form of heat which, if not directed away from the material, will cause the laser action to cease. This heat barrier of the active laser element has been fully discussed in connection with ruby in an article entitled "Effects of the Elevated Temperature of the Fluorescence on Optical Maser Activity of Ruby" by James P. Wittke, published in the Journal of Applied Physics, vol. 33, No. 7, July 1962, and is applicable to other laseable material.

In attempting to overcome this problem, scientists have utilized various techniques such as forced air cooling. However, it has been found that air is an extremely inefficient coolant and that there is a tendency for the polished interior of the pump cavity surrounding the pump lamp and the laseable material to tarnish and thus become less efficient in directing the pump energy to the active laser element. Furthermore, for airborne laser systems, this method is cumbersome and inefficient since the air must be supplied by some kind of mechanical refrigeration equipment. Small mechanical regrigerators are expensive, have limited life, tend to be heavy, and occupy excessive space. The air suplied by such a cooling system must be conducted through flexible tubing and presure drops and thermal losses along the way must be contended with. Also, a prime difficulty with the air system is the problem of regulating the temperature from the cooling to the heating mode.

Another approach in an attempt to solve this problem has been in the design of the laser pump cavity configuration under the theory that if a substantial portion of the optical pump energy can be directed or focused on the active laser element in the form of a rod, less pump energy will be wasted in directly heating the pump cavity. One example of this is the use of an elliptical pump cavity configuration wherein the pump lamp lies along one of the focal lines of the elliptical cylinder and the active laser element in the form of a rod lies along the other focal line. This configuration provides good focusing characteristics but results in a large air space between the laser rod and the cavity inner wall. When this laser is operated at a high repetition rate, the laser element becomes extremely hot and soon stops lasing since there is a very poor thermal path to conduct the heat away from the laser rod.

A solution of this problem would be very advantageous in that it would allow relatively high power-high repetition rate or possibly continuous wave operation, for use in long distance laser communications systems, laser radar applications and the like.

In contrast to a prejudice in the art of not placing any material within a focused type pump cavity structure other than the necessary pump lamp and active laser rod for fear of blocking a portion of the pumping light and thus reducing pumping efficiency, the present invention utilizes an efficient focused type pump cavity structure wherein there is disposed a thermal conducting member or pedestal in direct contact with the active laser rod disposed therein. This pedestal is adapted to conduct heat either to the rod or away from it to an area outside the pump cavity structure in any amount desirable, so that the temperature of the laser element may be controlled within an optimum range, to be discussed later.

It is therefore an object of the present invention to provide an improved thermally controlled solid-state laser.

It is another object of this invention to provide a thermally controlled solid-state laser which utilizes a new and effective technique to cotnrol the temperature of an active laser element disposed within a pump cavity.

It is still another object of the invention to provide a thermally controlled solid-state laser that regulates the temperature of the active laser element to a temperature range which allows laser operation at the optimum energy output and repetition rate.

These and other objects are achieved, according to one embodiment of the invention, in a thermally controlled solid-state laser comprising a solid-state laser rod disposed in an optical resonant cavity to produce coherent light energy when excited to a lasing state. A linear pump lamp is also included for producing light frequency pump energy. In order to direct the pump energy from the pump lamp to the laser rod to excite it to a lasing state, a focused type pump cavity structure is utilized. The cavity structure includes a pumping cavity enclosing the lamp and the laser rod—the lamp lying along one focal line of the pumping cavity and the laser rod along the other. Also included is a heat conducting pedestal in heat conductive contact with a longitudinal portion of the surface of the laser rod and that extending outside the pumping cavity in a direction opposite that of the laser rod from the pumping lamp.

The invention and specific embodiments thereof will be described hereinafter by way of example and with reference to the accompanying drawing wherein like reference numerals refer to like elements or parts, and in which:

FIG. 1 is a side view of a schematically drawn thermally controlled solid-state laser according to the invention;

FIG. 2 is a cross sectional view of the laser of FIG. 1;

FIG. 3 is water temperature controlled embodiment of the invention shown in FIGS. 1 and 2; and FIG. 4 is a thermoelectric controlled embodiment of the invention of FIGS. 1 and 2.

With reference now to the drawing and more particularly to FIGS. 1 and 2, there is shown a thermally controlled solid-state laser according to one embodiment of the invention. Here, a solid-state laser cylindrical rod 11 of chromium-doped sapphire (pink ruby) is situated within an optical resonant cavity comprising two deposited reflecting surfaces 13 of silver. One of the reflecting surfaces 13 is a heavier deposit than the other and therefore transmits less energy. The laser rod 11 is disposed along one focal line (not shown) of an elliptical focus type polished reflective pumping cavity 15 of an aluminum pump cavity structure 17. Lying along the other focal line of the pumping cavity 15 is a linear electronic flash-tube or lamp 19 for producing light frequency pump energy when connected to an appropriate pulse power source, not shown. The laser rod 11 is supported along substantially its length by and in thermal conductive contact with a thermal conducting pedestal 21 which extends outside the pumping cavity 15 through an opening 23 in the elliptical pump cavity structure 17 on the opposite side of the rod 11 from the lamp 19. As shown, the pedestal is thermally isolated from the structure 17.

In operation, when the lamp 19 is discharged or fired, essentially all of its luminous energy, both direct and reflected, impinges on the ruby rod 11 and its internal energy to an excited state. When thus excited, the ruby discharges this stored energy as an intense beam of monochromatic light, generally of extremely short duration through at least one of the reflecting surfaces 13.

In this laser action, the ruby rod 11 becomes warm due to the absorption of luminous and thermal energy from the lamp 19. The surface defining the elliptical pumping cavity 15 also becomes heated. For efficient operation, it is desirable and many times vital to regulate the temperature of the ruby to the range of approximately $23° \pm 5°$ C. for optimum energy output and repetition firing rate. At lower temperatures the control of laser pulses becomes difficult and at elevated temperatures the intensity of the emitted beam falls off or the device stops lasing altogether. However, by the use of the new and effective technique of invention, the temperature of the laser element or rod may be regulated for operation in the optimum thermal range.

An opinion generally held by those working in the laser field is that nothing should touch the lasing element during operation. It has been found, however, that a metallic fin can be attached to the laser rod, according to the invention, to serve as a thermal conducting path for cooling or heating the rod without substantially affecting its operation. In one of the devices tested and shown in FIGS. 1 and 2, the laser ruby rod 11 (¼-inch diameter and 2½ inches long) is attached to the upper edge 25 of the sheet of copper (pedestal 21) approximately 0.090 inch thick. This copper fin or pedestal serves as a conducting path from the laser rod 11 to a thermal radiator area or thermal regulators (see FIGS. 3 and 4) outside the cavity 15.

If under a particular type of operation only a moderate amount of cooling is necessary, the extension of a fairly large surface of the pedestal 21 outside the pump cavity structure 17 will be sufficient. However, for more cooling ability, conventional air fins may be attached to the lower portion of the pedestal 21 shown in FIGS. 1 and 2 (see air fins 57 in FIG. 4).

In the event that even more cooling ability is needed or if temperature range control is desired, the water jacket 31 shown in FIG. 3 may be attached by soldering, for example, to the pedestal 21. The water jackets 31 are fitted with inlet ports 33 and outlet ports 35 and the direction of water flow (not critical) is indicated by the arrows.

FIG. 4 illustrates how conventional thermoelectric modules 51 were attached to a copper pedestal 53 supporting a ruby rod 54 by means of a copper connecting portion 55. The thermoelectric units 51 may be operated in either their cooling mode or heating mode and a switching device (not shown) from one mode to the other can be any kind of thermal regulator (thermostatic device) capable of handling the current through the modules 51. A water cooled or other type of heat sink may be substituted for air fins 57. Additional modules 51 may be attached to the pedestal 53 if required.

In order to make good thermal contact between the laser rod and the supporting pedestal, the rod may be soft soldered to the top edge of the pedestal. To make such a joint, it may be necessary to metallize a narrow strip of the ruby surface to accept solder. This metallizing can be done by evaporating a thin metallic film of solderable metals in a vacuum as is common art, or by sputtering, or firing a metallized paint at high temperatures. In one instance, a narrow strip of a ruby laser rod surface was fired with a silver coating at approximately 1300° F. and tin-lead solder containing 2% silver was used for making the solder joint.

In most cases, there will be at least a slight difference in thermal expansion between the laser element and the heat conducting pedestal to which it is attached. The slots 61 shown in the pedestals 21 of FIGS. 1 and 2 are designed to allow the metal of the pedestal 21 to "give" to minimize strain on the laser rod 11. A slightly less efficient way of mounting the rod 11 would be to hold it in a small groove (not shown) at the top of the pedestal by some kind of fastening device such as the straps 71 attached by screws 73 to the pedestal 53 of FIG. 4.

In practicing the invention, solid-state active laser material other than ruby may be substituted for the ruby rod described, however, the active laser material should have relatively good thermal conducting properties to take advantage of the good thermal path provided by the pedestal. Of course, other types of flash lamps than the xenon lamp shown may be used. Also, the optical resonant cavity may be comprised of detached reflectors or may be dielectric flats instead of the silvered reflecting surfaces 13. Furthermore, the pedestal 21 is shown in FIG. 2 to be insulated from the pump cavity structure 17, however, it may in certain applications be desirable to provide thermal contact between the pedestal and the cavity structure and regulate the combination of laser element and cavity. This would require that the thermal regulator have more cooling/heating capacity.

From the foregoing, it will be evident that the invention provides an improved thermally controlled solid-state laser which utilizes a new and effective technique to control the temperature, in a predetermined range, of an active laser element disposed within a pump cavity.

Although only three embodiments of the invention have been described in detail, other organizations of the embodiments, such as the use of a parabolic or cylindrical cavity for focusing or directing the pump energy at the laser rod may be made within the spirit and scope of the invention.

Accordingly, it is intended that the foregoing disclosure and drawings shall be considered only as illustrations of the principles of this invention and are not to be construed in a limiting sense.

What is claimed is:

1. A thermally controlled solid-state laser, comprising: optical resonant cavity means for supporting laser energy produced therein; a solid-state laser rod disposed within said resonant cavity means and adapted when so disposed to produce coherent light energy when excited to a lasing state; pump energy means including a linear pump lamp for producing light frequency pump energy; and pump cavity means including a focused type pump cavity structure having a pumping cavity enclosing said lamp and said laser rod for focusing said pump energy at said laser rod to excite said rod to a lasing state, said pump cavity means including an elongated thermal conducting pedestal in thermal conductive contact with a longitudinal portion of the surface of said laser rod and extending outside said pumping cavity in a direction opposite that of said lamp, said pedestal having a narrower width dimension than said laser rod.

2. A thermally controlled solid-state laser, comprising: a solid-state laser cylindrical rod disposed within an optical resonant cavity and excited to a lasing state to produce coherent light energy; an optical resonant cavity including parallel reflective surfaces adjacent the ends of said laser rod; pump energy means including a linear pump lamp for producing light frequency energy; and pump cavity means including an elliptical pump cavity structure having a longitudinal axis and a pumping cavity with two focal lines parallel to said axis, said pumping cavity enclosing both said lamp and said laser rod which lie along different ones of said focal lines, said pump cavity means also including an elongated thermal conducting pedestal in thermal conductive contact with a longitudinal portion of the surface of said laser rod and extending outside said pumping cavity in a direction opposite that of said lamp, said pedestal having a narrower width dimension than said laser rod.

3. A thermally controlled solid-state laser, comprising: a ruby cylindrical laser rod having a longitudinal axis; a pair of reflecting surfaces disposed about said laser rod to reflect laser energy therethrough parallel to said axis; a xenon pump lamp; an aluminum pump cavity structure with a polished elliptical cylindrical cavity having a longitudinal axis, said cavity having two focal lines parallel to its axis and enclosing both said lamp and said laser rod, said lamp being disposed along one of said focal lines and said laser rod along the other; and an elongated copper pedetsal plate, one edge of which being in relatively good thermal contact with a longitudinal portion of the surface of said laser rod and thermally insulated from and extending outside said cavity structure in a direction away from said lamp in a plane including both said lamp and said laser rod, said pedestal having a narrower width dimension than said laser rod.

4. A thermally controlled solid-state laser, comprising: a ruby cylindrical laser rod having a longitudinal axis; a pair of reflecting elements disposed about said laser rod to reflect laser energy therethrough essentially parallel to said axis, at least one of said reflecting elements being partially transmissive of said laser energy; a linear xenon flash lamp; an aluminum pump cavity structure with a polished elliptical cylindrical cavity therein and having a longitudinal axis, said cavity having two focal lines parallel to its axis and enclosing both said lamp and said laser rod, said lamp being disposed along one of said focal lines and said laser rod along the other; an elongated copper pedestal plate, one edge of which being soft soldered to a longitudinal portion of the surface of said laser rod, said pedestal being thermally insulated from and extending outside said cavity structure in a direction away from said lamp in a plane including both said lamp and said laser rod, said pedestal having a narrower width dimension than said laser rod; and thermal control means in thermal contact with said pedestal to control the temperature of said laser rod in a predetermined range.

5. A thermally controlled solid-state laser, comprising: a ruby cylindrical laser rod having a longitudinal axis; a pair of reflecting elements disposed about said laser rod to reflect laser energy therethrough essentially parallel to said axis, at least one of said reflecting elements being partially transmissive of said laser energy; a linear xenon flash lamp; an aluminum pump cavity structure with a polished elliptical cylindrical cavity therein and having a longitudinal axis, said cavity having two focal lines parallel to its axis and enclosing both said lamp and said laser rod, said lamp being disposed along one of said focal lines and said laser rod along the other; an elongated copper pedestal plate, one edge of which being strapped to a longitudinal portion of the surface of said laser rod, said pedestal being thermally insulated from and extending outside said cavity structure in a direction away from said lamp in a plane including both said lamp and said laser rod, said pedestal having a narrower width dimension than said laser rod; and thermal control means in thermal contact with said pedestal to control the temperature of said laser rod in a predetermined range.

References Cited

UNITED STATES PATENTS

| | | | |
|---|---|---|---|
| 3,130,254 | 4/1964 | Sorokin et al. | 331—94.5 |
| 3,229,222 | 1/1966 | Sorokin et al. | 331—94.5 |
| 3,353,115 | 11/1967 | Maiman | 331—94.5 |
| 3,355,675 | 11/1967 | Varsanyi | 331—94.5 |
| 3,361,987 | 1/1968 | De Maria | 331—94.5 |
| 3,355,674 | 11/1967 | Hardy | 331—94.5 |
| 3,243,715 | 3/1966 | Welton | 330—4.3 |
| 3,387,227 | 6/1968 | Mastrup et al. | 331—94.5 |

OTHER REFERENCES

Roess, D.: Exfocal Pumping of Opt. Masers in Elliptical Cavities, Appl. Optics, vol. 3, No. 2, February 1964, pp. 259–265.

JEWELL H. PEDERSEN, Primary Examiner

T. MAJOR, Assistant Examiner